(12) United States Patent
Smith et al.

(10) Patent No.: US 7,997,157 B2
(45) Date of Patent: Aug. 16, 2011

(54) CONTROL MOMENT GYROSCOPE

(75) Inventors: Dennis Wayne Smith, Phoenix, AZ (US); Paul Buchele, Glendale, AZ (US); Carlos J. Stevens, Peoria, AZ (US); Stephen Edward Fiske, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 698 days.

(21) Appl. No.: 12/029,090

(22) Filed: Feb. 11, 2008

(65) Prior Publication Data

US 2009/0200428 A1    Aug. 13, 2009

(51) Int. Cl.
*G01C 19/30* (2006.01)

(52) U.S. Cl. ........................................ 74/5.47
(58) Field of Classification Search ................ 74/5.47
See application file for complete search history.

(56) References Cited

U.S. PATENT DOCUMENTS

| | | | |
|---|---|---|---|
| 3,171,612 A | 3/1965 | Hildebrant | |
| 3,285,076 A * | 11/1966 | Boothroyd | 74/5.6 R |
| 4,242,917 A | 1/1981 | Bennett et al. | |
| 4,491,029 A * | 1/1985 | Gruber et al. | 74/5.1 |
| 6,135,392 A | 10/2000 | Wakugawa | |
| 7,249,531 B2 | 7/2007 | Defendini et al. | |

FOREIGN PATENT DOCUMENTS

| | | |
|---|---|---|
| GB | 2103793 A | 2/1983 |
| WO | 9414653 A1 | 7/1994 |

OTHER PUBLICATIONS

EP Search Report dated May 13, 2009, EP 09151897.7.

* cited by examiner

*Primary Examiner* — Edwin A Young
(74) *Attorney, Agent, or Firm* — Ingrassia Fisher & Lorenz

(57) ABSTRACT

A control moment gyroscope (CMG) is provided for deployment on a spacecraft. The CMG includes an inner gimbal assembly (IGA), which, in turn, includes an IGA housing, a rotor rotatably coupled to the IGA housing, and a spin motor coupled to the IGA housing and configured to rotate the rotor about a spin axis. The CMG further comprises a stator assembly, which includes: (i) a stator assembly housing rotatably coupled to the IGA housing, and (ii) a torque module assembly coupled to the stator assembly housing and configured to rotate the IGA about a gimbal axis. A gimbal bearing is disposed between the IGA housing and the stator assembly housing. The gimbal bearing resides between the spin axis and the torque module assembly such that the distance between the gimbal bearing and the spin axis is less than the distance between the gimbal bearing and the torque module assembly.

19 Claims, 5 Drawing Sheets

CONTROL MOMENT GYROSCOPE

TECHNICAL FIELD

The present invention relates generally to rotational devices and, more particularly, to control moment gyroscope including a stator assembly having a large bore gimbal bearing.

BACKGROUND

Control moment gyroscopes (CMGs) are commonly employed in satellite attitude control systems. A generalized CMG may comprise a housing that supports an inner gimbal assembly (IGA). The IGA includes a rotor comprising an inertial element (e.g., a rotating ring or cylinder) coupled to a shaft. Spin bearings are disposed around the shaft ends to facilitate the rotational movement of the shaft, which may be rotated about a spin axis by a spin motor. The IGA, in turn, may be rotated about a gimbal axis by a torque module assembly (TMA) mounted to a first end of the CMG housing. To facilitate the rotational movement of the IGA, gimbal bearings are disposed between the IGA and the CMG housing. A signal module assembly (SMA) may also be mounted to a second portion of the CMG housing opposite the TMA to deliver electrical signals and power to the IGA. The CMG may also include a number of sensors (e.g., an encoder, a resolver, a tachometer, etc.) suitable for determining rotational rate and position of the IGA. Finally, a spacecraft interface (e.g., a plurality of bolt apertures) is provided on an outer surface of the CMG housing to permit the CMG to be mounted to (e.g., bolted to) a host spacecraft, such as a satellite.

To impart a desired torque to the host spacecraft, the TMA rotates the IGA, and thus the spinning rotor, about the gimbal axis. The spinning rotor is of sufficient mass and is spinning at such a rate that movement of the rotor out of its plane of rotation induces a significant torque about an output axis that is normal to the spin and gimbal axes. This torque is transmitted from the CMG rotor to the spacecraft along a rotor-to-spacecraft load path, which passes through both the IGA and CMG housings. Similarly, heat generated at the spin bearings as the result of friction may also be conducted to the spacecraft along the rotor-to-spacecraft load path.

CMGs of the type described above have been extensively engineered and are well-suited for use within spacecraft attitude control systems. This notwithstanding, conventional CMGs often provide a relatively lengthy and inefficient rotor-to-spacecraft load path. As noted above, a large portion of the rotor-to-spacecraft load path passes through the IGA and CMG housings. The IGA housing is typically thin-walled and flexible and, consequently, relatively poor at transmitting torque and conducting heat to the spacecraft. Although certain measures may be taken to stiffen the IGA housing (e.g., thickening the housing walls or providing ribs therein), these measures add surplus weight to the CMG. Furthermore, because the TMA and the SMA are mounted to opposite ends of the IGA housing, an undesirable twisting of the IGA housing and other components of the CMG is induced when the IGA is rotated about the gimbal axis.

Considering the above, it should be appreciated that it would be desirable to provide a CMG that overcomes the above-noted disadvantages. In particular, it would be advantageous if such a CMG provided an efficient rotor-to-spacecraft load path (i.e., a relatively short and stiff torque transmission path and an efficient thermal conduction path) in a relatively compact and lightweight envelope. It would also be desirable if such a CMG were designed to minimize or eliminate bending of the CMG components during gimbaling, as described above. Finally, it would be desirable if such a CMG were readily scalable. Other desirable features and characteristics of the present invention will become apparent from the subsequent detailed description of the invention and the appended claims, taken in conjunction with the accompanying drawings and this background of the invention.

BRIEF SUMMARY

A control moment gyroscope (CMG) is provided for deployment on a spacecraft. The CMG includes an inner gimbal assembly (IGA), which, in turn, includes an IGA housing, a rotor rotatably coupled to the IGA housing, and a spin motor coupled to the IGA housing and configured to rotate the rotor about a spin axis. The CMG further comprises a stator assembly, which includes: (i) a stator assembly housing rotatably coupled to the IGA housing, and (ii) a torque module assembly coupled to the stator assembly housing and configured to rotate the IGA about a gimbal axis. A gimbal bearing is disposed between the IGA housing and the stator assembly housing. The gimbal bearing resides between the spin axis and the torque module assembly such that the distance between the gimbal bearing and the spin axis is less than the distance between the gimbal bearing and the torque module assembly.

A stator assembly is also provided for supporting an inner gimbal assembly (IGA) including an IGA housing having a first end portion rotatably coupled to a rotor and a second end portion substantially opposite the first end portion. The stator assembly includes: (i) a stator assembly housing rotatably coupled to the IGA housing, and a torque module assembly mounted to the stator assembly housing and configured to impart torque to the IGA. The torque module assembly is disposed proximate the second end portion of the IGA housing. A gimbal bearing is disposed between the stator assembly housing and IGA. The gimbal bearing resides closer to the first end portion than to the second end portion of the IGA housing.

BRIEF DESCRIPTION OF THE DRAWINGS

At least one example of the present invention will hereinafter be described in conjunction with the following figures, wherein like numerals denote like elements, and.

DETAILED DESCRIPTION OF AT LEAST ONE EXEMPLARY EMBODIMENT

The following Detailed Description is merely exemplary in nature and is not intended to limit the invention or the application and uses of the invention. Furthermore, there is no intention to be bound by any theory presented in the preceding Background or the following Detailed Description.

In the subsequent description, reference is made to an exemplary signal module assembly (SMA) and to an exemplary torque module assembly (TMA). It is noted that the signal module assembly may also be referred to as a "sensor" module assembly, and that the torque module assembly may also be referred to as a torque "motor" assembly. Regardless of the particular terminology used, the signal module assembly may comprise any body or device suitable for transmitting electrical signals and/or power across a rotary interface (e.g., a slip ring assembly). Similarly, the torque module assembly or torque motor assembly may comprise any device or system suitable for imparting torque to a rotational body (e.g., an electromagnetic motor combined with a two-pass gear train). The TMA may or may not contain a position sensor and/or a rate sensor (e.g., an encoder, a resolver, a tachometer, etc.).

Figure 1:
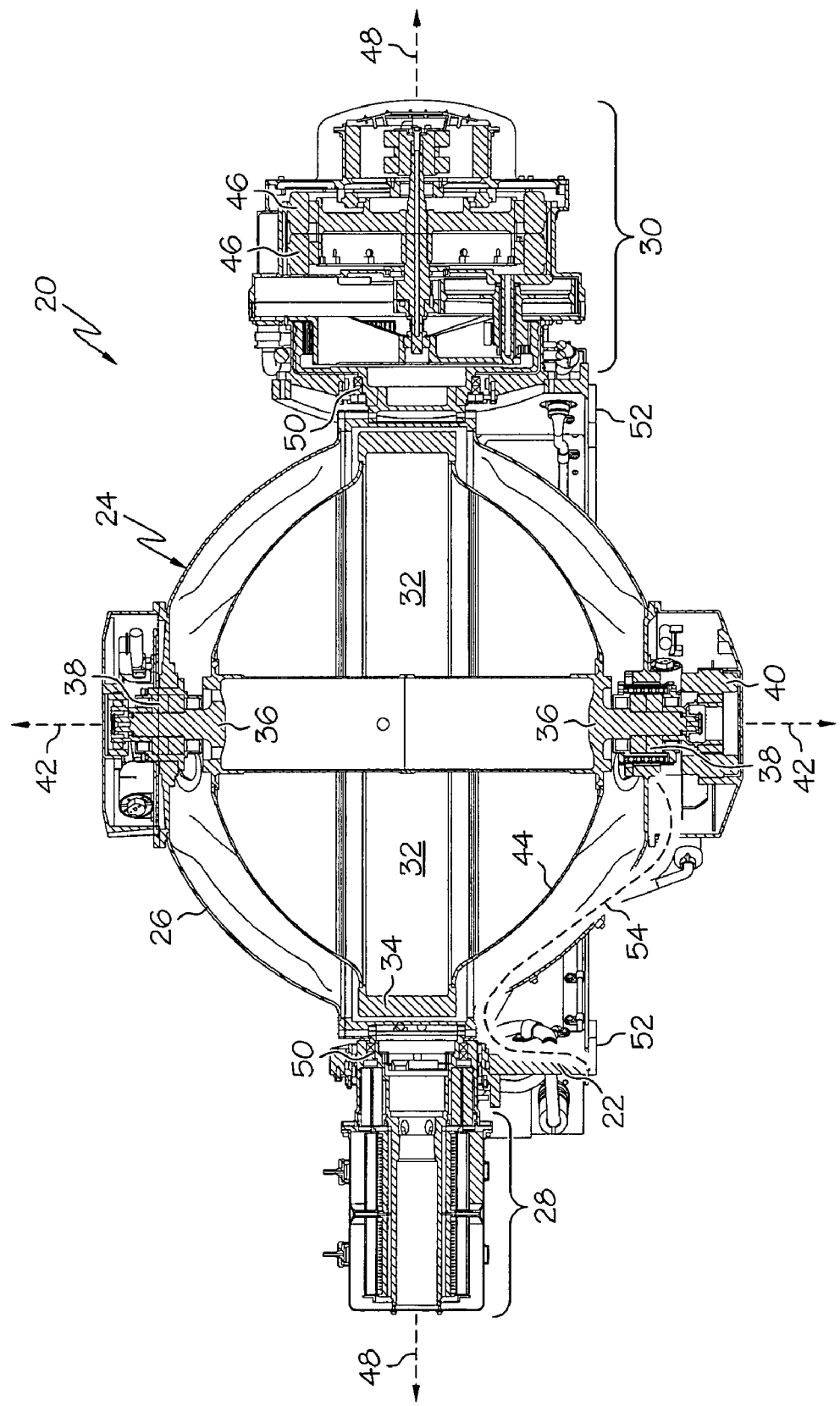
FIG. 1 is a cross-sectional view of a conventional control moment gyroscope having a relatively lengthy and inefficient rotor-to-spacecraft load path.

FIG. 1 is a cross-sectional view of a conventional control moment gyroscope (CMG) 20 suitable for deployment on a spacecraft, such as a satellite. CMG 20 comprises a CMG housing 22 in which an inner gimbal assembly (IGA) 24 is rotatably mounted. A signal module assembly (SMA) 28 and a torque module assembly (TMA) 30 are mounted to opposite end portions of CMG housing 22 such that IGA 24 is disposed between SMA 28 and TMA 30. IGA 24 includes a rotor assembly, which, in turn, includes a rotor 32. Rotor 32 comprises an inertial element 34 (e.g., a rotating ring or cylinder) coupled to a shaft 36 by way of a rotor shell 44. Shaft 36 has first and second opposing ends, each of which is received in a different annulus provided in IGA housing 26. To facilitate the rotational movement of rotor 32, a spin bearing 38 (e.g., a floating duplex bearing cartridge or a fixed duplex bearing cartridge) is provided within each annulus and disposed around a shaft end. A spin motor 40 is also disposed around a lower end portion of the shaft and, when energized, imparts torque to rotor 32 to rotate rotor 32 about a spin axis 42.

TMA 30 includes at least one electromagnetic motor 46 that may selectively rotate IGA 24 about a gimbal axis 48. In addition to electromagnetic motor 46, TMA 30 may also include other types of components (e.g., a gear train, a position sensor, a rate sensor, etc.) that are standard in the field and not discussed herein in the interests of concision. To facilitate the rotational movement of IGA 24, first and second gimbal bearings 50 are disposed between CMG housing 22 and IGA 24. Bearings 50 may each assume the form of, for example, a duplex bearing cartridge disposed within an outer sleeve that exerts a predetermined clamping force on the bearing cartridge.

To permit CMG 20 to be mounted to a spacecraft, a spacecraft interface 52 is provided on the exterior of CMG housing 22. Spacecraft interface 52 may comprise, for example, an annular structure having a plurality of bolt apertures therethrough that may be bolted directly onto the wall of a spacecraft or bolted to a mounting structure that is, in turn, attached to the spacecraft. During operation of CMG 20, TMA 30 selectively rotates IGA 24 about gimbal axis 48 to adjust the angular momentum of rotor 32 and, thus, impart gyroscopic torque to the host spacecraft. When this occurs, torque is transmitted from rotor 32 to the spacecraft along a path referred to herein as a direct rotor-to-spacecraft load path. In addition, excessive heat generated at spin bearings 38 is conducted away from spin bearing 38 and to the spacecraft through the rotor-to-spacecraft path. In FIG. 1, a portion of a rotor-to-spacecraft load path 54 is represented by a dotted line. As can be seen, the illustrated portion of rotor-to-spacecraft transmission path 54 passes from rotor 32, through spin bearings 38, through IGA housing 26, through gimbal bearings 50, through CMG housing 22, and ultimately to spacecraft interface 52.

Referring still to FIG. 1, it will be noted that rotor-to-spacecraft transmission path 54 is relatively lengthy and that a large portion of path 54 passes through IGA housing 26, which is relatively thin-walled and flexible. For these reasons, CMG 20 provides a relatively poor path for transmitting torque and for conducting heat from rotor 32 to spacecraft interface 52. Furthermore, because TMA 30 and the SMA 28 are mounted to opposite ends of CMG housing 22, an undesirable twisting motion may be imparted to IGA housing 26 and other components of CMG 20 when IGA 24 is rotated about gimbal axis 48. An exemplary embodiment of an improved CMG that overcomes these disadvantages will now be described in conjunction with FIGS. 2 and 3.

Figure 2:
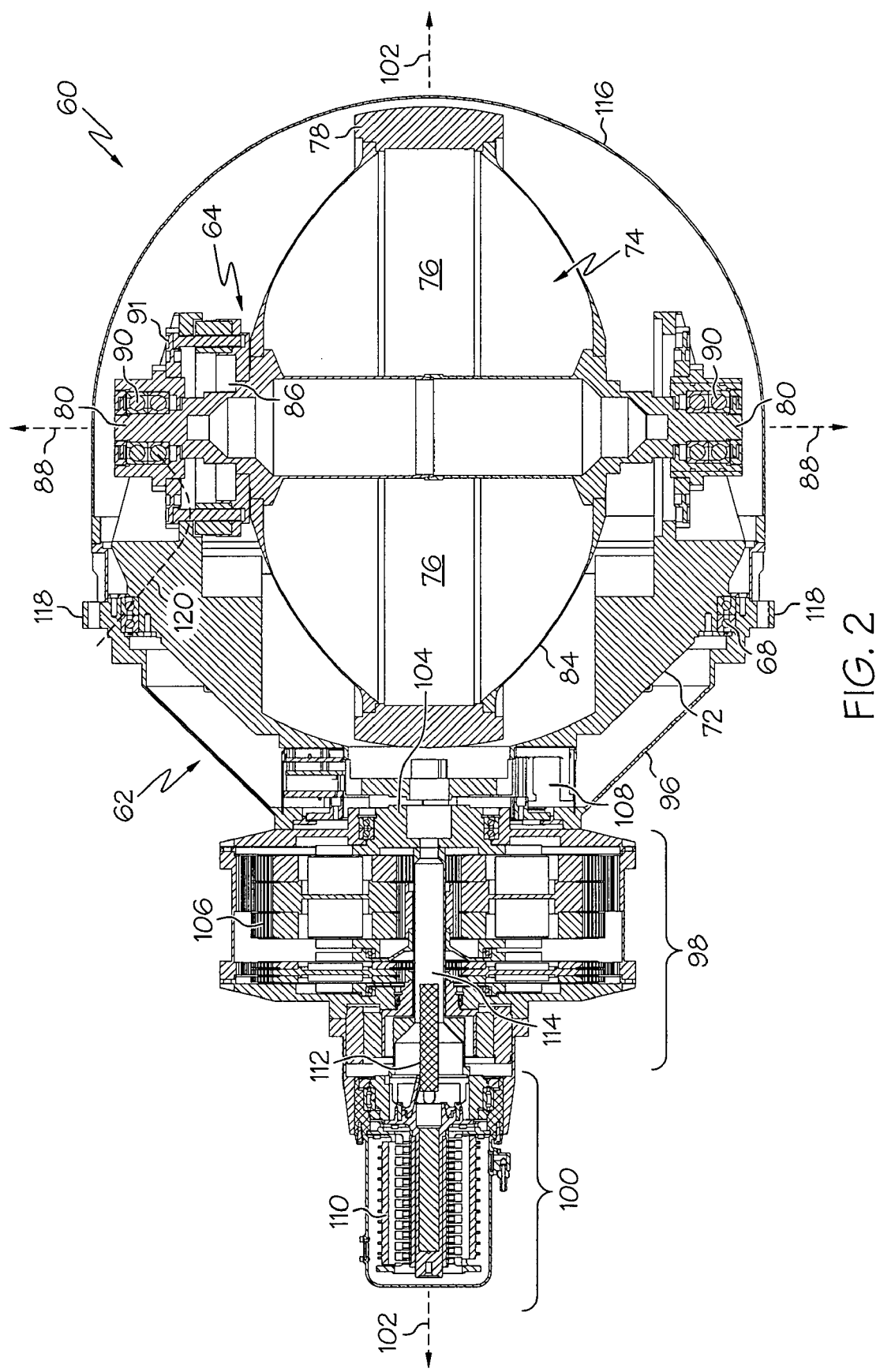
FIGS. 2 and 3 are cross-sectional and exploded views, respectively, of a control moment gyroscope having a relatively short and efficient rotor-to-spacecraft load path in accordance with a first exemplary embodiment.
Figure 3:
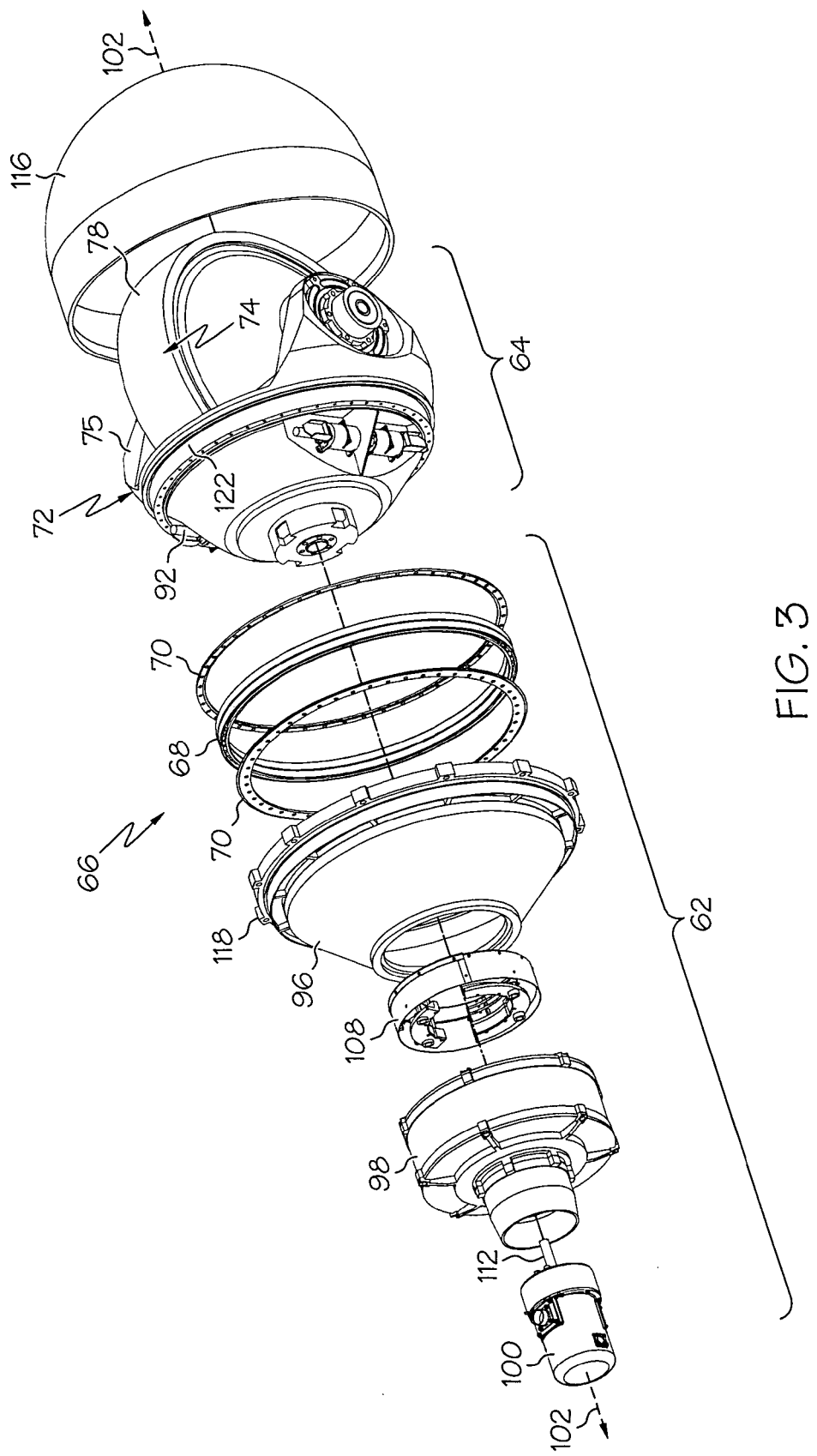

FIGS. 2 and 3 are cross-sectional and exploded views, respectively, of a CMG 60 including a large bore gimbal bearing in accordance with an exemplary embodiment. CMG 60 comprises two main assemblies, namely: (1) a stator assembly 62, and (2) an inner gimbal assembly (IGA) 64. IGA 64 includes a gimbal bearing assembly 66 (labeled in FIG. 3) that resides between stator assembly 62 and IGA 64. In the illustrated exemplary embodiment, gimbal bearing assembly 66 comprises an annular gimbal bearing 68 disposed between first and second gimbal bearing retainers 70. In FIGS. 2 and 3, gimbal bearing 68 is depicted as a duplex bearing pair having two rows of rolling elements (e.g., ball bearings) captured between an inner ring and an outer ring. This example notwithstanding, gimbal bearing assembly 66, and specifically gimbal bearing 68, may assume the form of any body or device suitable for facilitating the rotation of IGA 64. As may be appreciated by comparing FIGS. 2 and 3 to FIG. 1, gimbal bearing 68 is significantly larger than either of gimbal bearings 50 (FIG. 1); thus, gimbal bearing 68 may be considered a large bore bearing. By designing stator assembly 62 and IGA 64 to accommodate such a large bore bearing, it is possible to drastically reduce the length of the rotor-to-spacecraft load path as described in detail below.

IGA 64 includes an inner gimbal assembly (IGA) housing 72 that supports a rotor assembly 74. In the illustrated example, IGA housing 72 assumes the form of a substantially hemi-spherical body having two arms 75 that extend outwardly to engage opposite ends of rotor assembly 74, although the particular shape and configuration of IGA housing 72 will inevitably vary amongst embodiments. Rotor assembly 74 is similar to the rotor assembly of IGA 24 described above in conjunction with FIG. 1; as shown in FIG. 2, rotor assembly 74 comprises a rotor 76 that includes an inertial element 78 (e.g., a rotating ring or cylinder) coupled to a shaft 80 by way of a rotor shell 84.

IGA 64 further includes a spin motor 86, which may be disposed around an upper end portion of shaft 80. When energized, spin motor 86 rotates rotor 76 around a spin axis 88. Two spin bearings 90 are also disposed around opposite end portions of shaft 80. In the illustrated exemplary embodiment shown in FIG. 2, spin bearings 90 are depicted as duplex bearing pairs; however, as was the case with gimbal bearing 68, spin bearings 90 may assume the form of any body or device suitable for facilitating the rotation of rotor 76. IGA 64 may also comprise various other components that are standard in the industry and not described herein in the interests of concision, such as a tuned diaphragm 91 (shown in FIG. 2), spin bearing oilers 92 (shown in FIG. 3), a rate sensor, and so on.

Stator assembly 62 includes a stator assembly housing 96 to which a torque module assembly (TMA) 98 and a signal module assembly (SMA) 100 are coupled (e.g., TMA 98 may be mounted to stator assembly housing 96, and SMA 100 may be mounted to TMA 98). As does the TMA employed by the above-described CMG 20 (FIG. 1), TMA 98 functions to selectively rotate IGA 64 about a gimbal axis 102. However, in contrast to the above-described CMG, TMA 98 is positioned adjacent SMA 100 (i.e., TMA 98 resides between SMA 100 and IGA 64). As shown in FIG. 2, TMA 98 includes a motor (not shown) that is coupled to a rotating output shaft 104 by way of a gear train 106 (e.g., a two-pass gear train); however, TMA 98 may assume any form suitable for imparting torque to IGA 64 and may include other drive configurations, including harmonic and traction drive configurations. If desired, a position and/or a rate sensor (e.g., a rotary encoder, a resolver, a tachometer, etc.) may also be incorporated into TMA 98 to sense the position and/or rate of IGA 64. Additionally or alternatively, a position and/or a rate sensor may be disposed at another location within stator assembly housing 96. For example, as shown in FIGS. 2 and 3, a rotary encoder 108 may be mounted to stator assembly housing 96 between TMA 98 and IGA housing 72.

SMA 100 includes a slip ring assembly 110, or other device capable of transferring signals and power across a rotating interface, (FIG. 2) from which a cable bundle 112 or other such conductor extends. In particular, cable bundle 112 extends through a longitudinal channel 114 (FIG. 2) provided through TMA 98 to connect to IGA 64. SMA 100 permits electrical signals and power to be transferred across a rotary interface and supplied to spin motor 86, heaters (not shown), and any other electrical components incorporated into IGA 64. By configuring SMA 100 and TMA 98 in this manner, a significant savings in weight and packaging volume is achieved. Furthermore, in contrast to CMGs wherein the TMA and SMA are mounted within opposite ends of the stator assembly housing, CMG 60 experiences little to no bending forces when IGA 64 is rotated about gimbal axis 102.

In the illustrated exemplary embodiment shown in FIGS. 2 and 3, stator assembly 62 includes a stator cover 116. When coupled to stator assembly housing 96, stator cover 116 sealingly encloses IGA 64. Stator cover 116 permits near-vacuum conditions to be created within stator assembly 62 during the ground testing of CMG 60. Alternatively, the stator cover could reside over IGA housing 72 similarly enclosing IGA 64. Stator cover 116 is, of course, unnecessary to the operation of CMG 60 when deployed in space. Thus, in alternative embodiments, CMG 60 may not include stator cover 116. However, if provided, stator cover 116 is not required to support any additional components of CMG 60; nor is stator cover 116 required to provide a path for transmitting torque or conducting heat. Thus, stator cover 116 may be designed to be relatively thin-walled and have a perfect or nearly perfect hemi-spherical shape to minimize the overall volume and weight of CMG 60.

A spacecraft interface 118 is provided on the exterior of stator assembly housing 96. In this example, spacecraft interface 118 comprises a substantially annular structure through which gimbal axis 102 passes (e.g., gimbal axis 102 may pass through the center of interface 118). A plurality of bolt apertures is formed through spacecraft interface 118 to permit CMG 60 to be bolted to the wall of a host spacecraft or to a mounting structure that is, in turn, bolted to the host spacecraft. When mounted in this manner, CMG 60 may impart torque to the host spacecraft to control the attitude thereof. As described above, torque is imparted to the spacecraft along a direct rotor-to-spacecraft load path. Furthermore, heat generated from the rotation of rotor 76 is also dissipated by conduction to the spacecraft along the rotor-to-spacecraft load path. A portion of a rotor-to-spacecraft load path 120 is illustrated in FIG. 2. As can be seen, the rotor-to-spacecraft load path 120 passes from rotor 76, through spin bearings 90, through IGA housing 72, through gimbal bearing 68, through stator assembly housing 96, and to spacecraft interface 118. In contrast to the rotor-to-spacecraft load path described above in conjunction with FIG. 1, rotor-to-spacecraft load path 120 is relatively short. In addition, path 120 passes through a relatively thick-walled and stiff portion of IGA housing 72. Due to these factors, path 120 provides an efficient route for transmitting torque and conducting heat to the spacecraft. This enables a higher momentum output and improved spin bearing heat dissipation as compared to conventional CMGs, which, in turn, enhances the mission capability of the spacecraft carrying CMG 60.

There has thus been described an exemplary embodiment of a CMG 60 wherein a large bore gimbal bearing 68 is positioned relatively close to spin axis 88 and substantially adjacent spacecraft interface 118 to thereby significantly shorten the rotor-to-spacecraft load path. Gimbal bearing 68 is permitted to be so positioned due to the dimensions of bearing 68 as well as the design of stator assembly 62 and IGA 64. For example, as shown in FIG. 3, IGA housing 72 includes a gimbal bearing ring 122 around which gimbal bearing 68 is disposed. IGA housing 72 has a sloped outer surface having an average outer diameter, and the inner diameter of gimbal bearing 68 is greater than the average outer diameter of the sloped outer surface of IGA housing 72. In addition, spacecraft interface 118 and gimbal bearing 68 overlap. That is, spacecraft interface 118 and gimbal bearing 68 are each transected by a plane that is substantially orthogonal to gimbal axis 102 (e.g., interface 118 and bearing 68 may be substantially concentric). Furthermore, in the illustrated example, IGA housing 72 includes a generally hemi-spherical body having a first end portion rotatably coupled to stator assembly 62 and a second end portion from which two arms extend to support rotor assembly 74, wherein the outer diameter of the first end portion is smaller than the outer diameter of the second end portion. Notably, a majority of rotor-to-spacecraft path 120 passes through the first end portion. Finally, gimbal bearing 68 and rotor 76 are each transected by a plane that is substantially orthogonal to gimbal axis 102.

As indicated above, the portion of IGA housing 72 through which rotor-to-spacecraft load path 120 passes may be characterized by relatively thick, and therefore stiff, walls. In the exemplary embodiment shown in FIG. 2, the average thickness of IGA housing 72 (as taken along a plane orthogonal to gimbal axis 102) well exceeds twice the average thickness of gimbal bearing 68. In addition, the segment of direct rotor-to-spacecraft path 120 passing through IGA housing 72 has a length that is less than the height of IGA housing 72 (as taken along gimbal axis 102).

Figure 4:
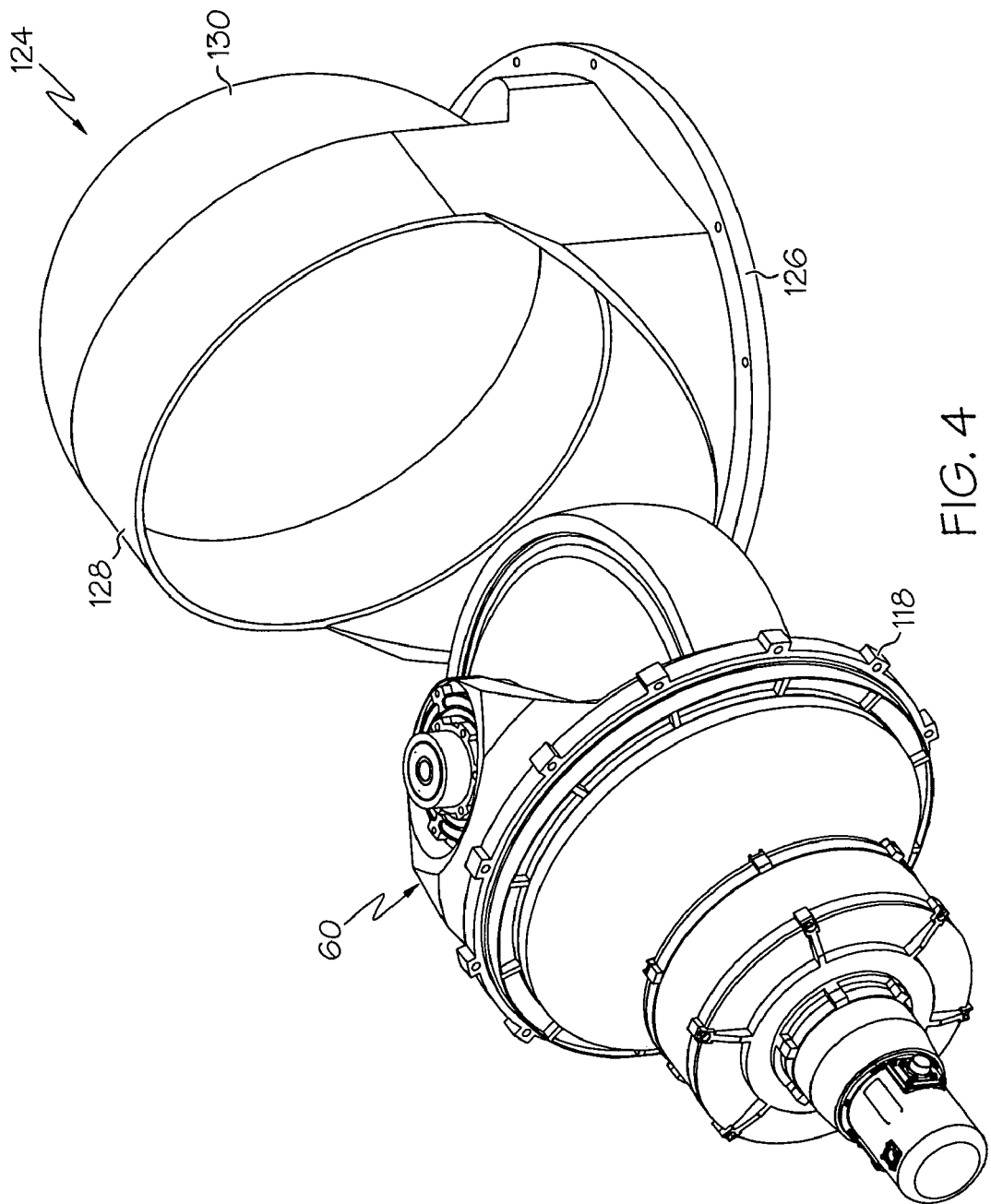
FIG. 4 is an isometric view illustrating an exemplary mounting structure that may be utilized to mount the control moment gyroscope shown in FIGS. 2 and 3 to a host spacecraft.

Due, at least in part, to its uniquely compact envelope, one or more CMG 60 may be mounted to a spacecraft in a wide variety of manners. For example, as shown in FIG. 4, CMG 60 may be received by a machined mounting structure 124 that is attached to a host spacecraft (not shown). Mounting structure 124 includes a base portion 126, which may be mounted (e.g., bolted) to the spacecraft, and a ring portion 128 that may circumferentially engage spacecraft interface 118. If CMG 60 does not include a stator cover (e.g., stator cover 116 shown in FIGS. 2 and 3), mounting structure 124 may also include a cover portion 130 that encloses rotor assembly 74. Of course, numerous other CMG mounting configurations are possible, as well.

Figure 5:
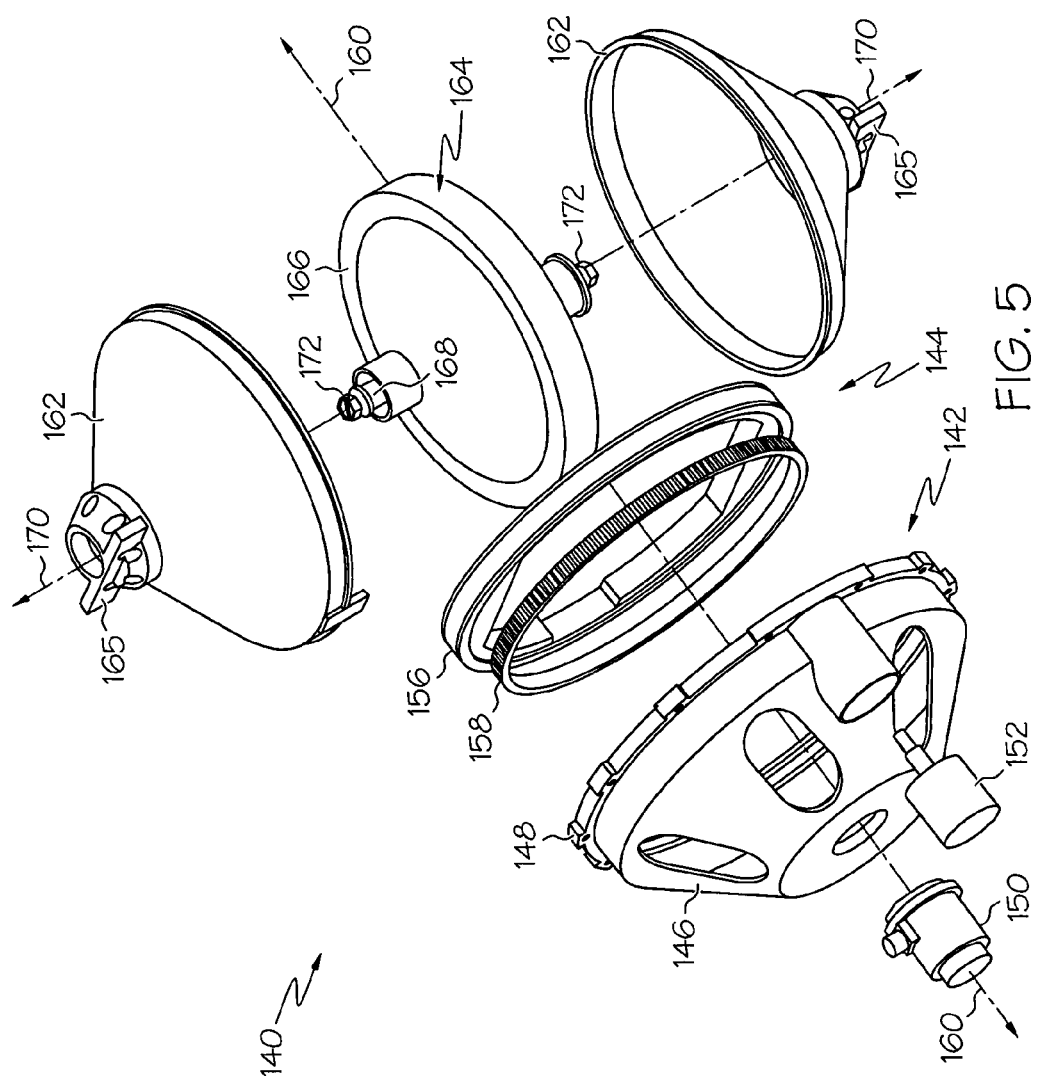
FIG. 5 is an exploded view of a control moment gyroscope in accordance with a second exemplary embodiment.

Although the following has described a preferred embodiment of a CMG having large bore bearing, it will be appreciated that the CMG may assume various other structural configurations without departing from the scope of the invention as set-forth in the appended claims. To further illustrate this point, FIG. 5 provides an exploded view of a CMG 140 in accordance with a second exemplary embodiment. CMG 140 is similar to CMG 60 described above in conjunction with FIGS. 2 and 3; thus, CMG 140 will not be described in detail other than to note the following. CMG 140 comprises a stator assembly 142 that rotatably supports an inner gimbal assembly (IGA) 144. Stator assembly 142 includes a stator assembly housing 146 having a spacecraft interface 148 disposed thereon. A signal module assembly (SMA) 150 and a torque module assembly (TMA) 152 are each mounted to stator assembly housing 146. IGA 144 includes an IGA housing 156, which, in this exemplary case, assumes the form of a ring. An annular gear 158 is fixedly coupled to IGA housing 156. When CMG 140 is assembled, the teeth of gear 158 engage a pinion coupled to a motor employed by TMA 152. As noted above, TMA 152 functions to impart torque to IGA housing 156 to selectively rotate IGA 144 about a gimbal axis 160. Again, a large bore gimbal bearing 154 is disposed within stator assembly housing 146 to facilitate the rotational movement of IGA 144.

IGA 144 further includes a rotor assembly comprising a cover 162 that encloses a rotor 164. Cover 162 has first and second flanges 165 that may be mounted to IGA housing 156 utilizing, for example, a plurality of fasteners (e.g., bolts). Rotor 164, in turn, comprises an inertial element 166 (e.g., a rotating ring or cylinder) coupled to a shaft 168. During the operation of CMG 140, rotor 164 rotates within cover 162 about a spin axis 170. A spin bearing 172 is disposed around each end of shaft 168 to facilitate the rotational movement of rotor 164. IGA 144 may then be rotated about the gimbal axis 160 to generate torque to the spacecraft. When CMG 140 is assembled, large bore gimbal bearing 154 resides relatively close to spin axis 170 and substantially adjacent spacecraft interface 148. As explained above, this results in a significantly shorter and stiffer rotor-to-spacecraft load path, which permits torque and heat to be efficiently transmitted/conducted from the CMG rotor to the host spacecraft.

There has thus been provided multiple examples of a CMG that provides an efficient rotor-to-spacecraft load path (i.e., a relatively short and stiff torque transmission path and an efficient thermal conduction path) in a relatively compact and lightweight envelope. Notably, the above-described CMG minimizes or eliminates the S-shaped bending forces commonly experienced by conventional CMGs during operation. In addition, it will be appreciated by one skilled in the art that the design of the above-described CMG is readily scalable.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A control moment gyroscope (CMG) for deployment on a spacecraft, the CMG comprising:
    an inner gimbal assembly (IGA), comprising:
        an IGA housing;
        a rotor rotatably coupled to the IGA housing; and
        a spin motor coupled to the IGA housing and configured to rotate the rotor about a spin axis; and
    a stator assembly, comprising:
        a stator assembly housing rotatably coupled to the IGA housing;
        a torque module assembly coupled to the stator assembly housing and configured to rotate the IGA about a gimbal axis; and
        a gimbal bearing disposed between the IGA housing and the stator assembly housing, the gimbal bearing residing between the spin axis and the torque module assembly, and the distance between the gimbal bearing and the spin axis being less than the distance between the gimbal bearing and the torque module assembly.

2. A CMG according to claim 1 further comprising a spacecraft interface located on the stator assembly housing substantially adjacent the gimbal bearing.

3. A CMG according to claim 2 wherein the gimbal axis extends through the spacecraft interface.

4. A CMG according to claim 2 wherein the spacecraft interface and the gimbal bearing at least partially overlap.

5. A CMG according to claim 2 wherein the spacecraft interface and the gimbal bearing are each transected by a first plane, the first plane being substantially orthogonal to the gimbal axis.

6. A CMG according to claim 1 wherein the gimbal bearing comprises a substantially annular bearing disposed around the IGA housing.

7. A CMG according to claim 6 wherein the IGA housing includes a sloped outer surface having an average outer diameter, and wherein the inner diameter of the substantially annular bearing is greater than the average outer diameter of the sloped outer surface.

8. A CMG according to claim 1 wherein the rotor comprises a shaft having opposing end portions each rotatably coupled to the IGA housing.

9. A CMG according to claim 1 further comprising a signal module assembly coupled to the stator assembly housing substantially adjacent the torque module assembly.

10. A CMG according to claim 9 wherein the torque module assembly is disposed between the signal module assembly and the IGA.

11. A CMG according to claim 1 wherein the IGA housing comprises a body having a first end portion coupled to the stator assembly and a second end portion coupled to the rotor.

12. A CMG according to claim 11 wherein the body is substantially hemi-spherical, and wherein the first end portion has a smaller outer diameter than does the second end portion.

13. A CMG according to claim 1 wherein a first plane transects the gimbal bearing and the rotor, the first plane being substantially orthogonal to the gimbal axis.

14. A CMG according to claim 13 wherein the average thickness of the IGA housing as taken along the first plane is at least twice the average thickness of the gimbal bearing.

15. A CMG according to claim 1 wherein the direct rotor-to-spacecraft load path passes from the rotor, through the IGA housing, through the gimbal bearing, through the stator assembly housing, and to the spacecraft interface.

16. A CMG according to claim 15 wherein the segment of the direct rotor-to-spacecraft load path passing through the IGA housing has a length that is less than the height of the IGA housing as taken along the gimbal axis.

17. A stator assembly for supporting an inner gimbal assembly (IGA) including an IGA housing having a first end portion rotatably coupled to a rotor and a second end portion substantially opposite the first end portion, the stator assembly comprising:
- a stator assembly housing rotatably coupled to the IGA housing;
- a torque module assembly mounted to the stator assembly housing and configured to impart torque to the IGA, the torque module assembly disposed proximate the second end portion; and
- a gimbal bearing disposed between the stator assembly housing and IGA, the gimbal bearing residing closer to the first end portion than to the second end portion.

18. A stator assembly according to claim 17 further comprising a spacecraft interface disposed on the stator assembly housing, the spacecraft interface and the gimbal bearing being substantially concentric.

19. A stator assembly for use in conjunction with an inner gimbal assembly (IGA) including an IGA housing in which a rotor is mounted for rotation about a spin axis, the stator assembly comprising:
- a stator assembly housing rotatably coupled to the IGA housing;
- a signal module assembly coupled to the stator assembly housing;
- a torque module assembly coupled to the stator assembly housing configured to impart torque to the IGA;
- a spacecraft interface disposed on the stator assembly housing between the torque module assembly and the spin axis; and
- a gimbal bearing disposed between the stator assembly housing and the IGA, the gimbal bearing residing substantially adjacent the spacecraft interface;
- wherein the torque module assembly is disposed between the signal module assembly and the gimbal bearing.

* * * * *